United States Patent
Akashi (10) Patent No.: US 11,801,578 B2
(45) Date of Patent: Oct. 31, 2023

(54) FOREIGN MATTER DETECTION DEVICE WHICH DETECTS PENETRATION OF FOREIGN MATTER INTO INTERIOR OF ELECTRIC MOTOR ARRANGED IN MACHINE TOOL

(71) Applicant: FANUC CORPORATION, Yamanashi (JP)

(72) Inventor: Koudai Akashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 610 days.

(21) Appl. No.: 16/751,224

(22) Filed: Jan. 24, 2020

(65) Prior Publication Data

US 2020/0246930 A1    Aug. 6, 2020

(30) Foreign Application Priority Data

Jan. 31, 2019    (JP) .................... 2019-015768

(51) Int. Cl.
*B23Q 17/00*    (2006.01)

(52) U.S. Cl.
CPC .................. *B23Q 17/007* (2013.01)

(58) Field of Classification Search
CPC .................................................. B23Q 17/007
See application file for complete search history.

(56) References Cited

U.S. PATENT DOCUMENTS

| | | | |
|---|---|---|---|
| 5,447,078 A | 9/1995 | Robinson, Jr. et al. | |
| 10,302,762 B2 * | 5/2019 | Mizusawa | B23Q 11/126 |
| 10,364,840 B2 * | 7/2019 | Kamiya | G07C 3/00 |
| 2016/0341631 A1 * | 11/2016 | Kamiya | G01M 13/04 |
| 2017/0087681 A1 * | 3/2017 | Matsuda | B23Q 11/0067 |
| 2017/0219152 A1 * | 8/2017 | Petrou | F16L 27/087 |

FOREIGN PATENT DOCUMENTS

| | | | | |
|---|---|---|---|---|
| DE | 102013104035 A1 * | 10/2014 | .......... | B23Q 17/007 |
| DE | 102016205944 A1 * | 10/2017 | | |
| GB | 2547056 A * | 8/2017 | ............ | B23Q 11/10 |
| JP | S50-106607 U | 9/1975 | | |
| JP | S61137054 A | 6/1986 | | |
| JP | 2002-131187 A | 5/2002 | | |
| JP | 2003166696 A | 6/2003 | | |
| JP | 2004-242416 A | 8/2004 | | |
| JP | 2008222165 A | 9/2008 | | |
| JP | 2008297821 A | 12/2008 | | |
| JP | 2010159710 A | 7/2010 | | |
| JP | 2016131004 A | 7/2016 | | |
| JP | 2017-34858 A | 2/2017 | | |
| JP | 2017129411 A | 7/2017 | | |
| JP | 2018-187703 A | 11/2018 | | |
| JP | 20192894 A | 1/2019 | | |
| JP | 2019002894 A * | 1/2019 | | |
| WO | WO-2008046826 A1 * | 4/2008 | ............ | B23Q 17/00 |
| WO | 2018084278 A1 | 5/2018 | | |

\* cited by examiner

*Primary Examiner* — Eric A. Gates
(74) *Attorney, Agent, or Firm* — HAUPTMAN HAM, LLP (57) ABSTRACT

A foreign matter detection device includes an ion sensor arranged in the interior of a feed axis motor. The ion sensor is formed so as to detect an ion contained in a cutting liquid. A machine controller judges whether an ion concentration is within a judgment range related to the cutting liquid based on output of the ion sensor, and judges that the cutting liquid has penetrated into the interior of the feed axis motor when the ion concentration is within the judgment range related to the cutting liquid.

11 Claims, 4 Drawing Sheets

FOREIGN MATTER DETECTION DEVICE WHICH DETECTS PENETRATION OF FOREIGN MATTER INTO INTERIOR OF ELECTRIC MOTOR ARRANGED IN MACHINE TOOL

RELATED APPLICATIONS

The present application claims priority to Japanese Application Number 2019-015768, filed Jan. 31, 2019, the disclosure of which is hereby incorporated by reference herein in its entirety.

BACKGROUND OF THE INVENTION

1. Field of the Invention

The present invention relates to a foreign matter detection device which detects the penetration of foreign matter into the interior of an electric motor arranged in a machine tool.

2. Description of the Prior Art

The use of motors for the movement and rotation of components of a device has been known. Devices equipped with a motor can be used in various environments. For example, a motor may be used in an environment in which there is a large amount of dust or dirt. In this case, there is a risk that foreign matter such as dust or dirt may penetrate into the interior of the motor, leading to failure of the motor.

It is preferable that devices which control motors be capable of detecting the penetration of foreign matter into the interior of the motor. In the prior art, the detection of the penetration of foreign matter into bearings or the like by detecting the voltage or impedance, etc., in the electric circuits for driving the motor is known (refer to, for example, Japanese Unexamined Patent Publication No. 2002-131187A and Japanese Unexamined Patent Publication No. 2017-34858A). Additionally, a method for detecting foreign matter by forming a part of the electrical circuit in the bearing of the motor is known (refer to, for example, Japanese Unexamined Utility Model Publication No. 50-106607U).

Further, the arrangement of a sensor in a device in order to detect abnormalities of the components of the device is known. For example, the arrangement of a temperature detector in a motor in order to detect corruption of an oil seal arranged in the motor is known (refer to, for example, Japanese Unexamined Patent Publication No. 2004-242416A). Additionally, the arrangement of a sensor in a spindle head in order to judge whether there are components in the spindle head of a machine tool in which an abnormality has occurred is known (refer to, for example, Japanese Unexamined Patent Publication No. 2018-187703A).

SUMMARY OF THE INVENTION

In the case in which a workpiece is cut or polished, machining of the workpiece with a machine tool is known. When the workpiece is machined by the machine tool, swarf is generated. Furthermore, when the workpiece is machined, cutting liquid may be supplied toward the portion in which the workpiece is machined in some cases. Swarf and cutting liquid are scattered around the portion in which machining is performed. Thus, in some cases, a machining chamber, which is a room for the machining of workpieces, may be arranged in the machine tool. The machining chamber is formed so that the swarf and the cutting liquid are not scattered externally.

Motors may be arranged in the interior of the machining chamber of the machine tool in some cases. For example, a spindle motor, which rotates a spindle supporting a tool, is arranged in the interior of the machining chamber. Additionally, a feed axis motor which moves a table on which a workpiece is secured and a feed axis motor which moves a member to which the spindle head is secured may be arranged in the interior of the machining chamber in some cases. Such motors are used in environments in which significant amounts of swarf and cutting liquid are present. As a result, foreign matter can easily penetrate into the interiors of the motors.

If foreign matter penetrates into the interior of a motor, the performance of the motor may be reduced or failure of the motor may occur in some cases. If the performance of the motor is reduced or if the motor fails, there is a problem in that it is necessary to stop the machine tool. Thus, the capability to detect, with high accuracy, the penetration of foreign matter into the interior of a motor is preferable.

An aspect of the present disclosure provides a foreign matter detection device which detects the penetration of foreign matter into an interior of an electric motor arranged in a machine tool. The foreign matter detection device includes a sensor arranged in the interior of the electric motor. The foreign matter detection device includes a controller which judges whether the foreign matter has penetrated into the interior of the electric motor based on output of the sensor. The sensor is formed so as to detect physical property of the foreign matter. The controller includes a storage unit which stores information on the physical property of the foreign matter, and a judgment unit which judges the penetration of the foreign matter and a type of the foreign matter by comparing the output of the sensor with the information on the physical property of the foreign matter.

DETAILED DESCRIPTION

The foreign matter detection device, which detects the penetration of foreign matter, according to the embodiment will be described with reference to FIG. 1 to FIG. 4. The foreign matter detection device according to the present embodiment judges the penetration of foreign matter into the interior of an electric motor of a machine tool, and further, judges the type of the penetrated foreign matter.

Figure 1:
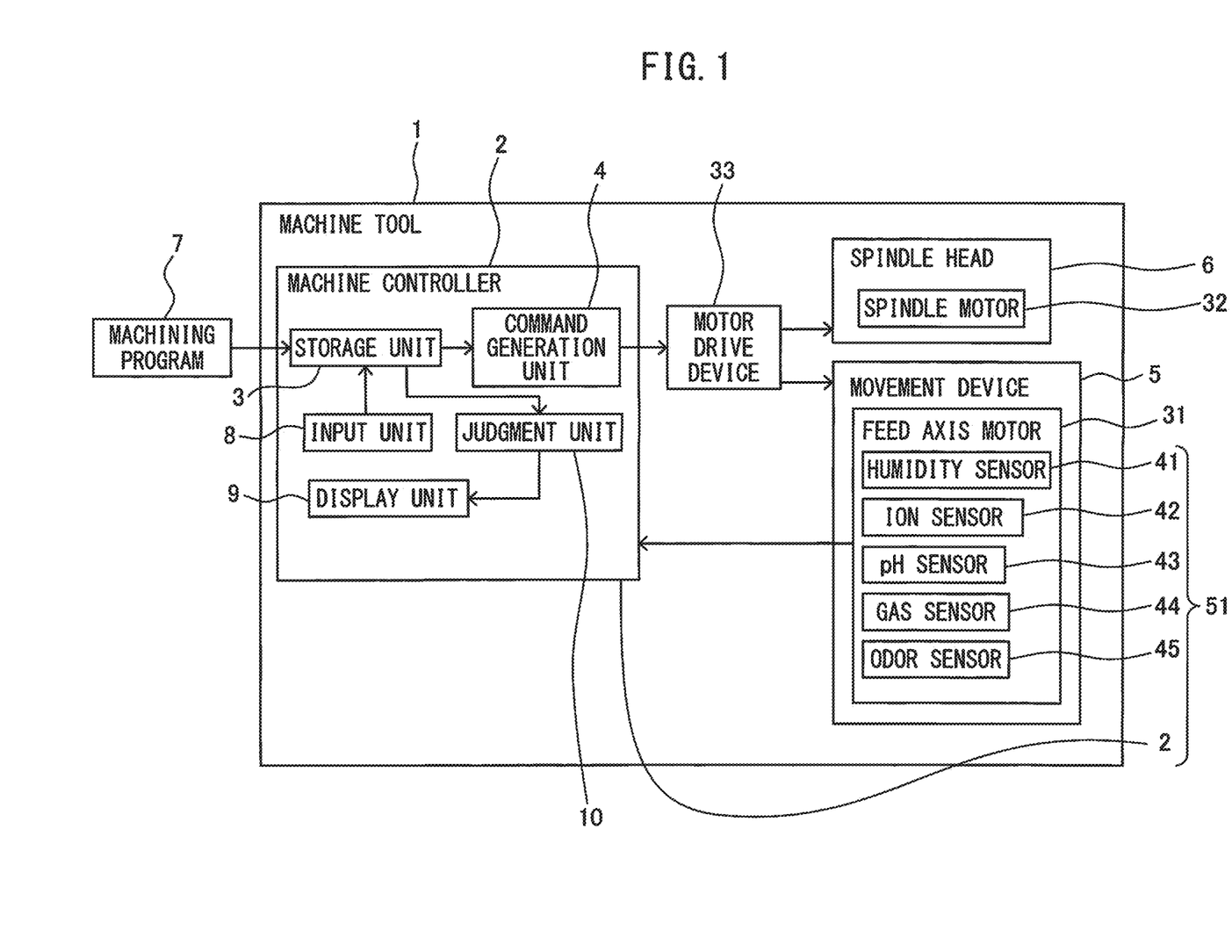
FIG. 1 is a block diagram of a machine tool including a first foreign matter detection device according to an embodiment.

FIG. 1 is a block diagram of a machine tool according to the present embodiment. The machine tool 1 machines a workpiece while changing the position of a tool relative to the workpiece. The machine tool 1 includes feed axes which change the position of the tool relative to the workpiece. For example, the feed axes may be configured as three linear axes (X-axis, Y-axis, and Z-axis). The feed axes of the machine tool 1 are not limited to this form, and the feed axes can be configured from any linear axes or rotary feed axes.

The machine tool 1 includes a drive device 5 which moves the workpiece or the tool along the feed axis. The drive device 5 includes feed axis motors 31 which are arranged corresponding to the respective feed axes. The machine tool 1 includes a spindle head 6 which rotates the tool while retaining the tool. The spindle head 6 includes a spindle which supports the tool, and a spindle motor 32 which rotates the spindle.

The machine tool 1 includes a machine controller 2 which controls the feed axis motors 31 and the spindle motor 32. The machine controller 2 according to the present embodiment includes an arithmetic processing device (computer) including a CPU (Central Processing Unit) as a processor. The arithmetic processing device includes RAM (Random Access Memory) and ROM (Read-Only Memory), etc., which are connected to the CPU via a bus.

The machine tool 1 according to the present embodiment is of a numerically-controlled type. A machining program 7 for operating the machine tool 1 may be generated in advance by an operator. The machine controller 2 includes a storage unit 3 which stores the machining program 7 and information related to machining such as a judgment range, and a command generation unit 4 which generates operation commands for the motors based on the machining program 7. The storage unit 3 can be constituted by a storage medium such as a volatile memory, nonvolatile memory, or hard disk which is capable of storing information. The command generation unit 4 corresponds to a processor which is driven in accordance with the machining program 7. The command generation unit 4 is formed so as to be capable of reading the information stored in the storage unit 3. The processor functions as the command generation unit 4 by reading the machining program 7, and executing the control specified in the machining program 7.

The machine tool 1 includes a motor drive device 33 which supplies electricity to the feed axis motors 31 and the spindle motor 32 based on the operation commands generated by the machine controller 2. The feed axis motors 31 and the spindle motor 32 are driven as a result of the supply of electricity by the motor drive device 33.

The machine controller 2 includes an input unit 8 with which an operator inputs information related to machining. The input unit 8 is constituted by, for example, an input device such as a keyboard, dial, or mouse. The machine controller 2 includes a display unit 9 which displays information related to machining. The display unit 9 is constituted by, for example, a display such as a liquid crystal display panel.

Figure 2:
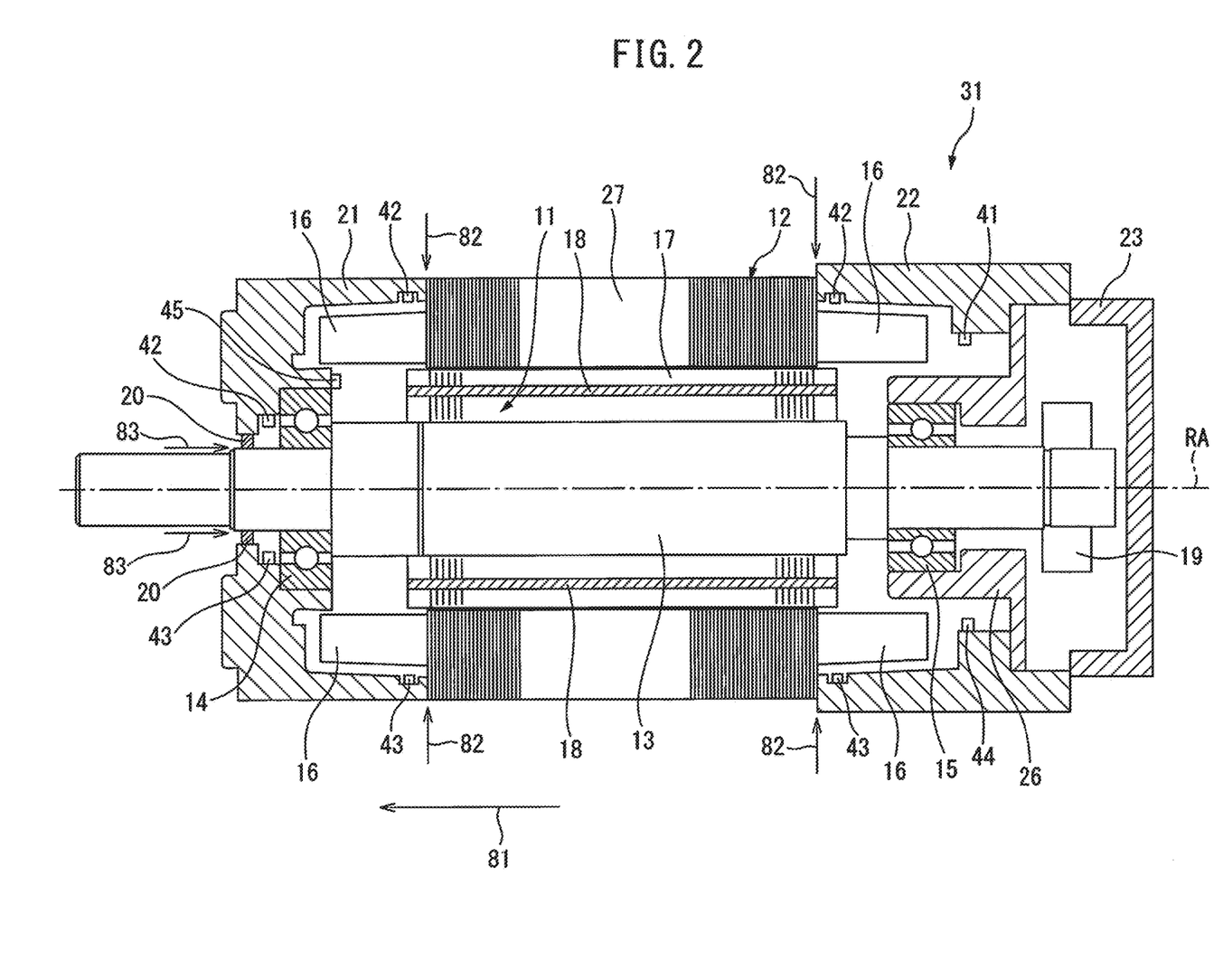
FIG. 2 is a schematic cross-sectional view of a feed axis motor in which a sensor of a first foreign matter detection device according to the embodiment is arranged.

FIG. 2 is a partial schematic cross-sectional view of an electric motor in which the sensor of the first foreign matter detection device according to the present embodiment is arranged. The electric motor according to the present embodiment is arranged in the machine tool. In the present embodiment, a feed axis motor 31 will be described as an example of the electric motor. The feed axis motor 31 includes a rotor 11 and a stator 12. The stator 12 includes a stator core 27 which is formed by, for example, a plurality of magnetic steel plates stacked in the axial direction. Coils 16 are wound around the stator core 27. The rotor 11 includes a rod-shaped shaft 13, a rotor core 17 which is secured to the outer peripheral surface of the shaft 13, and a magnet 18 which is arranged in the interior of the rotor core 17. The magnet 18 according to the present embodiment is a permanent magnet. The shaft 13 is connected to another member in order to transmit rotational force. The shaft 13 rotates around an axis of rotation RA. In the present embodiment, the side on which the shaft 13 is connected to the other member in the direction in which the axis of rotation RA extends is referred to as the front side. Furthermore, the side opposite the front side is referred to as the rear side. In the example shown in FIG. 2, arrow 81 indicates the front side of the feed axis motor 31.

The feed axis motor 31 includes a front side housing 21 and a rear side housing 22 as housings. The housings 21, 22 are tubularly shaped. The stator 12 is secured to the housings 21, 22 by means of fastening members such as bolts. The housings 21, 22 rotatably support the rotor 11 via bearings 14, 15. The housing 21 supports the bearing 14. A bearing support member 26 which supports the bearing 15 is affixed in the housing 22. An oil seal 20 which suppresses the penetration of foreign matter is arranged between the front side end of the housing 21 and the shaft 13.

An encoder 19 for detecting the rotational position or rotation number of the shaft 13 is arranged on the rear side end of the shaft 13. A rear cover 23 which closes the gap in the interior of the housing 22 is arranged on the rear side end of the housing 22.

Referring to FIG. 1 and FIG. 2, the machine tool 1 includes a first foreign matter detection device 51 which detects the penetration of foreign matter into the interior of the electric motor arranged in the machine tool 1. The first foreign matter detection device 51 according to the present embodiment detects the penetration of foreign matter into the interior of the feed axis motor 31.

The feed axis motor 31 according to the present embodiment is arranged in the interior of the machining chamber of the machine tool 1. The machining chamber is surrounded by a member constituting a wall, which is referred to as a splashguard. Swarf is generated when a workpiece is machined. Furthermore, when a workpiece is machined, cutting liquid for cooling the workpiece and reducing friction between the workpiece and the tool is supplied. Additionally, the cutting liquid may have a function for removing swarf remaining in the vicinity of the machining point of the workpiece. The cutting liquid is ejected, for example, toward the portion in which the workpiece is machined from a nozzle arranged in the machine tool 1.

Large quantities of cutting liquid and swarf are scattered in the interior of the machining chamber. Foreign matter such as cutting liquid and swarf are present around the feed axis motor 31. Furthermore, a reduction gear may be connected to the feed axis motor 31 in some cases. Lubricant is applied to the interior of the reduction gear. The foreign matter detection device according to the present embodiment detects the penetration of at least one type of foreign matter, including cutting liquid, swarf, and lubricant, into the interior of the feed axis motor 31.

The first foreign matter detection device 51 detects the penetration of cutting liquid. The foreign matter detection device 51 includes sensors arranged in the interior of the feed axis motor 31. The foreign matter detection device 51 includes a plurality of sensors. The foreign matter detection device 51 includes a humidity sensor 41, an ion sensor 42, a pH sensor 43, a gas sensor 44, and an odor sensor 45. The foreign matter detection device 51 includes a controller which judges whether foreign matter has penetrated into the interior of the feed axis motor 31 based on the output of the sensor. In the present embodiment, the machine controller 2 functions as the controller which judges the penetration of foreign matter. It should be noted that the sensors for acquiring predetermined signals are arranged in the interior of the electric motor, and electrical circuits which process the signals acquired from the sensors may be arranged on the exterior of the electric motor.

The sensors arranged in the interior of the feed axis motor 31 are formed so as to detect the physical property of the foreign matter which may penetrate into the interior of the feed axis motor 31. The machine controller 2 stores information on the physical property of foreign matter in the storage unit 3. The information related to the physical property of the foreign matter includes, for example, a judgment range related to physical property value of the foreign matter. An operator may produce the information related to the physical property of the foreign matter in advance. The operator inputs the information on the physical property of the foreign matter into the storage unit 3 via the input unit 8.

The machine controller 2 includes a judgment unit 10 which judges the penetration of foreign matter into the interior of the feed axis motor 31 and the type of penetrated foreign matter. The judgment unit 10 corresponds to a processor which is driven in accordance with the machining program 7. The processor functions as the judgment unit 10 by reading the machining program 7 and executing the control specified in the machining program 7.

The judgment unit 10 acquires the information on the physical property of the foreign matter form the storage unit 3. Furthermore, the judgment unit 10 acquires the output of the sensor. The judgment unit 10 judges the penetration of foreign matter and the type of the foreign matter by comparing the output of the sensor with the information on the physical property of the foreign matter. In other words, the judgment unit 10 judges whether specific foreign matter has penetrated into the interior of the electric motor.

In the control according to the present embodiment, the judgment unit 10 judges whether a physical property value is within a judgment range related to the foreign matter based on the output of the sensor. The judgment range related to the foreign matter is set in advance and stored in the storage unit 3. When the physical property value based on the outputs of the sensor is within the judgment range related to the foreign matter, the judgment unit 10 judges that the foreign matter has penetrated into the interior of the motor. The judgment ranges of the physical property values can be determined in advance by the operator.

The judgment of the judgment unit 10 is not limited to this form. For example, a judgment range of a rate of increase of the physical property value of the foreign matter can be stored in the storage unit 3 as the information on the physical property of the foreign matter. The judgment unit 10 can calculate the rate of increase of the physical property value of the foreign matter based on the outputs of the sensor. The judgment unit 10 can judge that foreign matter has penetrated when the rate of increase is within the judgment range. Additionally, whether or not a predetermined substance is present can be stored in the storage unit 3 as the information on the physical property of the foreign matter. When the predetermined substance is detected based on the output of the sensor, the judgment unit 10 judges that the foreign matter has penetrated.

The judgment unit 10 can acquire the output of the sensor at arbitrary time to execute judgment on the penetration of foreign matter and the type of foreign matter. For example, the judgment unit 10 can perform judgment during the period when the feed axis motor 31 is driven. Additionally, the judgment unit 10 can perform judgment during the period when the workpiece is machined, i.e., during the period in which large quantities of cutting liquid and swarf are present in the interior of the machining chamber. Alternatively, the judgment unit 10 can perform judgment during the period in which the foreign matter to be detected is generated. For example, when the foreign matter is cutting liquid, the judgment unit 10 can perform judgment on the penetration of cutting liquid during the period when cutting liquid is ejected toward the workpiece from the nozzle for supplying cutting liquid.

When the penetration of a specific foreign matter into the interior of the electric motor is detected as a result of the judgment of the judgment unit 10, the display unit 9 can display information on the component which may be at risk of degradation or failure due to the specific foreign matter. The relationship between the specific foreign matter and the component which may be at risk of degradation or failure is stored in the storage unit 3. Alternatively, the display unit 9 can display a warning for the operator. The operator can see the warning displayed on the display unit 9, and can repair the feed axis motor 31 or prepare a replacement component.

Next, the control for detecting the penetration of foreign matter based on the outputs of the respective sensors will be described. It should be noted that though a plurality of sensors are included in the foreign matter detection device 51 according to the present embodiment, the device is not limited to this form. It is sufficient that the foreign matter detection device 51 includes at least one sensor.

The foreign matter detection device 51 includes the humidity sensor 41 as the sensor for detecting the physical property of the foreign matter. The humidity sensor 41 detects the humidity of the air in the interior of the feed axis motor 31. Water-soluble cutting liquid and water-insoluble cutting liquid are present in the cutting liquid of the machine tool. In the present example, water-soluble cutting liquid is used. Since the water-soluble cutting liquid is diluted with water, water is present in the components thereof. The gap in the interior of the feed axis motor 31 is sealed. When water-soluble cutting liquid penetrates into the interior of the feed axis motor 31, the humidity in the gap in the interior of the feed axis motor 31 increases.

The storage unit 3 stores a humidity judgment range related to the water-soluble cutting liquid as the information on the physical property of the foreign matter. The judgment unit 10 judges whether the humidity in the interior of the feed axis motor 31 is within the judgment range related to the cutting liquid based on the output of the humidity sensor 41. For example, the humidity sensor 41 detects the humidity in the interior of the feed axis motor 31. The judgment unit 10 judges whether the humidity detected by the humidity sensor 41 is greater than a humidity judgment value related to the cutting liquid. When the humidity is greater than the judgment value related to the cutting liquid, the judgment unit 10 judges that the water-soluble cutting liquid has penetrated into the interior of the motor.

Alternatively, a judgment range related to a humidity increase rate may be stored as the information on the physical property of the foreign matter. When the humidity acquired by the humidity sensor 41 is increasing at a rate greater than a predetermined judgment value, the judgment unit 10 may judge that the water-soluble cutting liquid has penetrated into the interior of the feed axis motor 31.

When it is judged that the water-soluble cutting liquid has penetrated into the interior of the feed axis motor 31, the display unit 9 displays that the cutting liquid has penetrated. Furthermore, the display unit 9 displays information on components which are at risk of degradation or failure due to contact with the water-soluble cutting liquid. For example, the display unit 9 displays information such as a risk of insulation failure in the windings used in components such as the coils 16. Alternatively, the display unit 9 can display information such as a risk of the generation of rust in components such as the bearings 14, 15, the rotor core 17, and the stator core 27.

Since the rotor 11 rotates in the interior of the feed axis motor 31, the air in the interior of the feed axis motor 31 is agitated. The humidity in the gap in the interior of the feed axis motor 31 is substantially constant. Thus, the humidity sensor 41 can be arranged at any position in the gap in the interior of the feed axis motor 31. In the example shown in FIG. 2, the humidity sensor 41 is secured to the inner circumferential surface of the housing 22. Alternatively, the humidity sensor 41 may be secured to a member arranged in the interior of the housings 21, 22, such as the bearing support member 26.

Next, the foreign matter detection device 51 includes the gas sensor 44 and the odor sensor 45 as sensors for detecting the physical properties of the foreign matter. The gas sensor 44 and odor sensor 45 are sensors which detect the gas corresponding to a substance contained in the cutting liquid. Though both the gas sensor 44 and the odor sensor 45 are provided in the example shown in FIG. 1 and FIG. 2, only one of these sensors may be provided.

The gas sensor 44 detects a specific gas contained in the air in the interior of the feed axis motor 31. For example, sulfur compounds may be contained in the cutting liquid as an extreme pressure additive in some cases. In this case, a gas sensor 44 which detects hydrogen sulfide generated from the sulfur compounds is provided. The gas sensor 44 according to the present embodiment detects the concentration of the specific gas.

The odor sensor 45 detects odors in the air in the interior of the feed axis motor 31. For example, an organic compound may be added to the cutting liquid as an additive in some cases. In addition to serving as an extreme pressure additive, the organic compound additive suppresses the occurrence of rusting of the workpiece or serve as a surfactant. The organic compound generates specific odor. When a volatile organic compound is included in the additive of the cutting liquid, an odor sensor 45 which detects the odor of the organic compound is provided. The odor sensor 45 of the present embodiment detects the strength of odor. The strength of the odor corresponds to the concentration of the gas. Thus, the odor sensor 45 can detect the concentration of the specific gas.

The judgment range of the concentration of the gas related to the cutting liquid can be used as the information on the physical property of the foreign matter in these cases. The judgment range of the concentration of the gas related to the cutting liquid is determined in advance and stored in the storage unit 3. The judgment unit 10 acquires the output of the gas sensor 44 or the odor sensor 45. The judgment unit 10 acquires the judgment range related to the cutting liquid from the storage unit 3. The judgment unit 10 judges whether the concentration of the gas is within the judgment range related to the cutting liquid based on the output of the gas sensor 44 or the odor sensor 45. When it is determined that the concentration of the gas is within the judgment range related to the cutting liquid, the judgment unit 10 judges that the cutting liquid has penetrated into the interior of the feed axis motor 31.

It should be noted that the judgment unit 10 can calculate the concentration of the gas from the strength of the odor detected by the odor sensor 45. Alternatively, when the strength of the odor is within a predetermined odor strength judgment range, it may be judged that the concentration of the gas is within the gas concentration judgment range.

When it is judged that the cutting liquid has penetrated into the interior of the feed axis motor 31, the display unit 9 displays that cutting liquid has penetrated. Furthermore, the display unit 9 can display information on the component which may be degraded or may fail due to contact with the cutting liquid. For example, when it is judged that cutting liquid containing a sulfur compound has penetrated into the interior of the feed axis motor 31, the display unit 9 can display that the component formed from rubber may become damaged. For example, the display unit 9 can display that there is a risk of damage to the O-rings arranged between the housings 21, 22 and the stator 12, the O-rings arranged in portions in which detectors are affixed, or the oil seal 20.

Like the humidity sensor 41, the gas sensor 44 and the odor sensor 45 can be arranged in arbitrary positions in the gap in the interior of the feed axis motor 31. In the example shown in FIG. 2, the gas sensor 44 is affixed to the inner surface of the housing 22. Furthermore, the odor sensor 45 is affixed to the inner surface of the housing 21.

Next, the foreign matter detection device 51 includes the ion sensor 42 which detects an ion corresponding to a substance contained in the cutting liquid as the sensor for detecting physical property of the foreign matter. A chlorine compound, a sulfur compound, or a phosphorus compound may be contained in the cutting liquid as the additive in some cases. For example, these compounds may be included as extreme pressure additives in some cases. A sensor which detects the ion corresponding to the chlorine compound, sulfur compound, or phosphorus compound can be used as the ion sensor 42. When, for example, the chlorine compound is included in the additive of the cutting liquid, an ion sensor 42 which detects the chloride ion can be provided. When the sulfur compound is included in the additive of the cutting liquid, an ion sensor 42 which detects the sulfide ion can be provided. Alternatively, when the phosphorus compound is included in the additive of the cutting liquid, an ion sensor 42 which detects the phosphide ion can be provided.

A sensor which judges whether a specific ion at a concentration equal to or greater than a predetermined concentration is included in a liquid can be used as the ion sensor 42. Alternatively, a sensor which detects the concentration of the ion in a liquid can be used as the ion sensor 42.

An ion concentration judgment range related to the cutting liquid can be used as the information on the physical property of the foreign matter in these cases. The ion concentration judgment range related to the cutting liquid is determined in advance and stored in the storage unit 3. The judgment unit 10 acquires the output of the ion sensor 42. The judgment unit 10 acquires the ion concentration judgment range related to the cutting liquid from the storage unit 3. The judgment unit 10 judges whether the ion concentration is within the judgment range related to the cutting liquid based on the output of the ion sensor 42. When the ion concentration is within the judgment range related to the cutting liquid, the judgment unit 10 judges that the cutting liquid has penetrated into the interior of the feed axis motor 31.

When it is judged that the cutting liquid has penetrated into the interior of the feed axis motor 31, the display unit 9 can display information on the penetration of the cutting liquid and information on the component which may be at risk of degradation or failure due to contact with the cutting liquid. For example, when the ion sensor 42 detects the chloride ion, the display unit 9 can display that there is a risk of degradation of the component formed from resin arranged in the interior of the feed axis motor 31. For example, the display unit 9 can display that there is a risk of degradation of the resin impregnating agents formed so as to enclose the coils. Alternatively, when the ion sensor 42 is a sensor which detects the sulfide ion, the display unit 9 can display that there is a risk of degradation of the component formed from rubber, such as the oil seal 20.

The ion sensor 42 can be arranged in any position in the interior of the feed axis motor 31. However, in order for the ion sensor 42 to detect the ion, it is necessary that the ion sensor 42 contacts the liquid. Thus, the ion sensor 42 is preferably arranged in the vicinity of the path through which the cutting liquid penetrates into the interior of the feed axis motor 31.

The cutting liquid penetrates from the seams between components of the feed axis motor 31. The feed axis motor 31 includes a plurality of components which isolate the exterior and the interior of the feed axis motor 31. For example, the housings 21, 22, the stator 12, the rear cover 23, the shaft 13, and the oil seal 20 correspond to components which isolate the interior and the exterior of the feed axis motor 31. The ion sensor 42 is preferably arranged in the vicinity of portions in which these components contact each other.

For example, as indicated by arrow 82, the cutting liquid penetrates from the portion at which the housing 21 and the stator 12 contact or from the portion at which the housing 22 and the stator 12 contact. Alternatively, the cutting liquid penetrates into the gap in the interior of the feed axis motor 31 from the portion at which the oil seal 20 and the shaft 13 contact, as indicated by arrow 83. Thus, in the example shown in FIG. 2, ion sensors 42 are arranged in the vicinity of the portions at which the housings 21, 22 and the stator 12 contact each other. Furthermore, an ion sensor 42 is arranged in the vicinity of the portion at which the oil seal 20 and the shaft 13 contact. An ion sensor 42 is arranged in the gap interposed by the oil seal 20 and the bearing 14. As a result of the use of this configuration, the penetrating cutting liquid is likely to come into contact with the ion sensors 42, whereby the penetration of the cutting liquid can be more reliably detected. In addition to the above forms, an ion sensor may be arranged in the vicinity of the portion at which the rear cover 23 and the housing 22 contact.

Next, the foreign matter detection device 51 includes a pH sensor 43 which detects a pH value as the sensor for detecting the physical property of the foreign matter. The pH sensor 43 can detect the pH value of the liquid. Various additives are contained in the cutting liquid, as described above. The pH value changes depending on the additives.

A pH value judgment range related to the cutting liquid can be used as the information on the physical property of the foreign matter in this case. The pH value judgment range related to the cutting liquid is determined in advance and stored in the storage unit 3. The judgment unit 10 acquires the output of the pH sensor 43. The judgment unit 10 judges whether the pH value is within the judgment range related to the cutting liquid based on the output of the pH sensor 43. When the pH value is within the judgment range related to the cutting liquid, the judgment unit 10 judges that the cutting liquid has penetrated into the interior of the feed axis motor 31.

When it is judged that the cutting liquid has penetrated into the interior of the feed axis motor 31, the display unit 9 can display, along with the information on the penetration of the cutting liquid, information on the component for which there is a risk of degradation or failure due to contact with the cutting liquid. For example, when the cutting liquid is alkali, it can be displayed that there is a risk of failure of components which are made of aluminum, such as the housings 21, 22. Furthermore, the display unit 9 can display that there is a risk of degradation of components made of rubber, such as the oil seal 20, or components made of resin.

In order for the pH sensor 43 to detect pH values, it is necessary that the pH sensor contacts the liquid. Thus, like the ion sensor 42, the pH sensor 43 is preferably arranged in the vicinity of the portion at which components which isolate the exterior and the interior of the feed axis motor 31 contact each other. In the example shown in FIG. 2, pH sensors 43 are arranged in the vicinity of the portion at which the housing 21 and the stator 12 contact, in the vicinity of the portion at which the housing 22 and the stator 12 contact, and the vicinity of the portion at which the oil seal 20 and the shaft 13 contact.

At least one of the humidity sensor 41, the ion sensor 42, the pH sensor 43, the gas sensor 44, and the odor sensor 45 is arranged in the feed axis motor 31 in this manner. Further, the judgment unit 10 compares with the predetermined judgment range related to the cutting liquid, whereby it can be judged whether the cutting liquid has penetrated into the interior of the feed axis motor 31.

The foreign matter detection device 51 according to the present embodiment includes a plurality of sensors in order to judge the penetration of the cutting liquid as specific foreign matter. The plurality of sensors include sensors which are of mutually different types. In the example shown in FIG. 1 and FIG. 2, five types of sensors, such as the humidity sensor 41 and the ion sensor 42, are provided.

Among the plurality of sensors, two or more sensors having mutually different types can be arranged in the interior of the feed axis motor 31. The judgment unit 10 judges the penetration of foreign matter and the type of foreign matter for the outputs of the respective sensors. For example, the judgment unit 10 judges whether the cutting liquid has penetrated for the outputs of the respective sensors. Further, when the judgment unit 10 judges that foreign matter has penetrated for the output of at least one of the plurality of sensors, it can be judged that the foreign matter has penetrated into the interior of the feed axis motor 31. According to this control, the penetration of foreign matter can be quickly detected. For example, when a humidity sensor 41 is used, in some cases, it can take time for the humidity to increase. Furthermore, it is necessary for the ion sensor to contact the cutting liquid. However, by arranging the humidity sensor 41 and the ion sensor 42 in the feed axis motor 31, the opportunities to detect the penetration of the cutting liquid increase, and the penetration of the cutting liquid can be quickly detected.

Alternatively, when it is judged that foreign matter has penetrated for the outputs of all of the plurality of sensors, the judgment unit 10 may judge that foreign matter has penetrated into the feed axis motor 31. In other words, when it is judged that foreign matter has not penetrated for the output of at least one of the plurality of sensors, the judgment unit 10 may finally judge that the cutting liquid has not penetrated into the interior of the feed axis motor 31. For example, it is judged that cutting liquid has penetrated based on the output of the ion sensor 42. However, it may be judged that cutting liquid has not penetrated based on the output of the humidity sensor 41. In this case, the judgment unit 10 can finally judge that the cutting liquid has not penetrated. Due to this control, it can be judged that foreign matter has penetrated only when the foreign matter has reliably penetrated.

Figure 3:
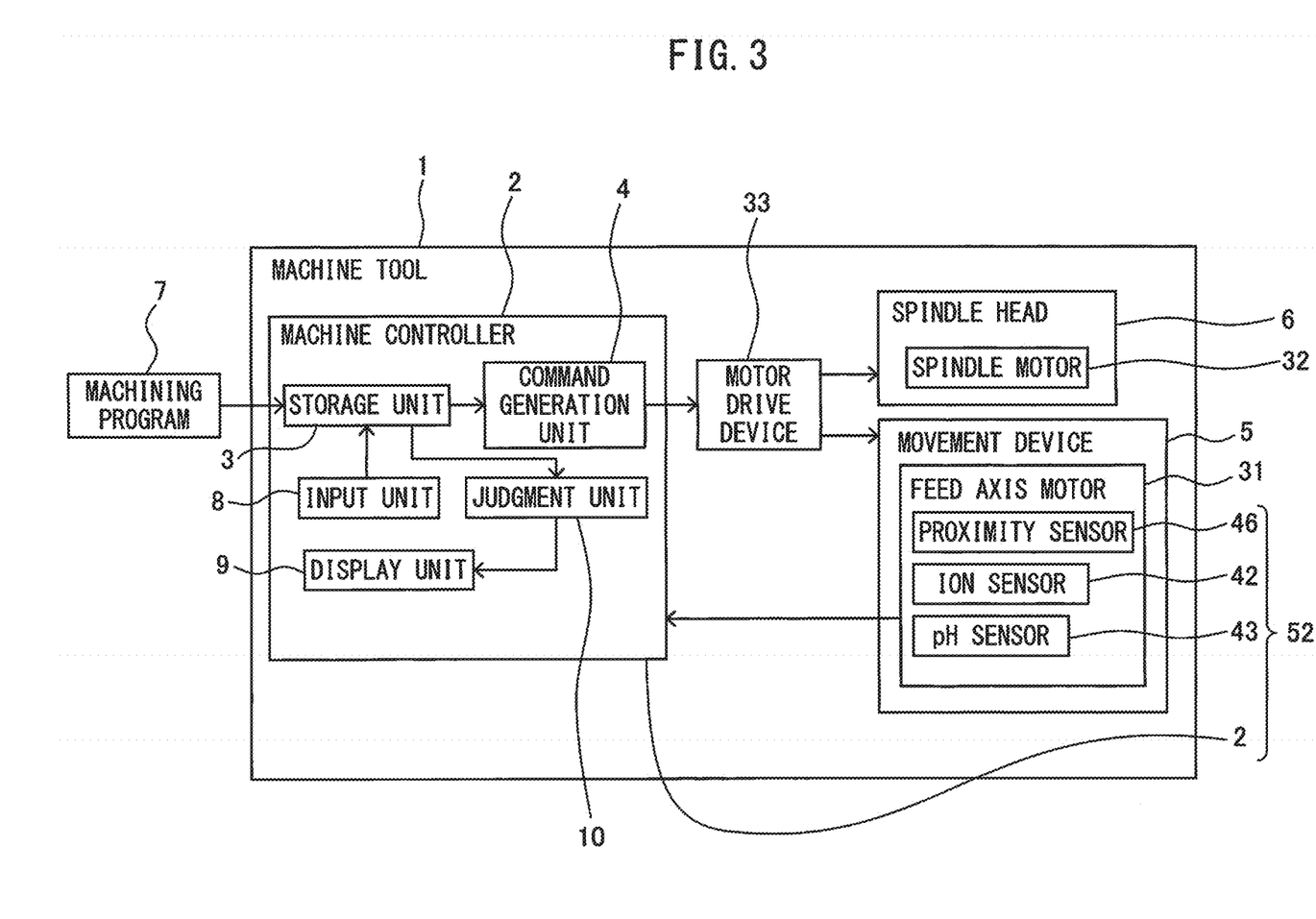
FIG. 3 is a block diagram of a machine tool including a second foreign matter detection device according to the embodiment.
Figure 4:
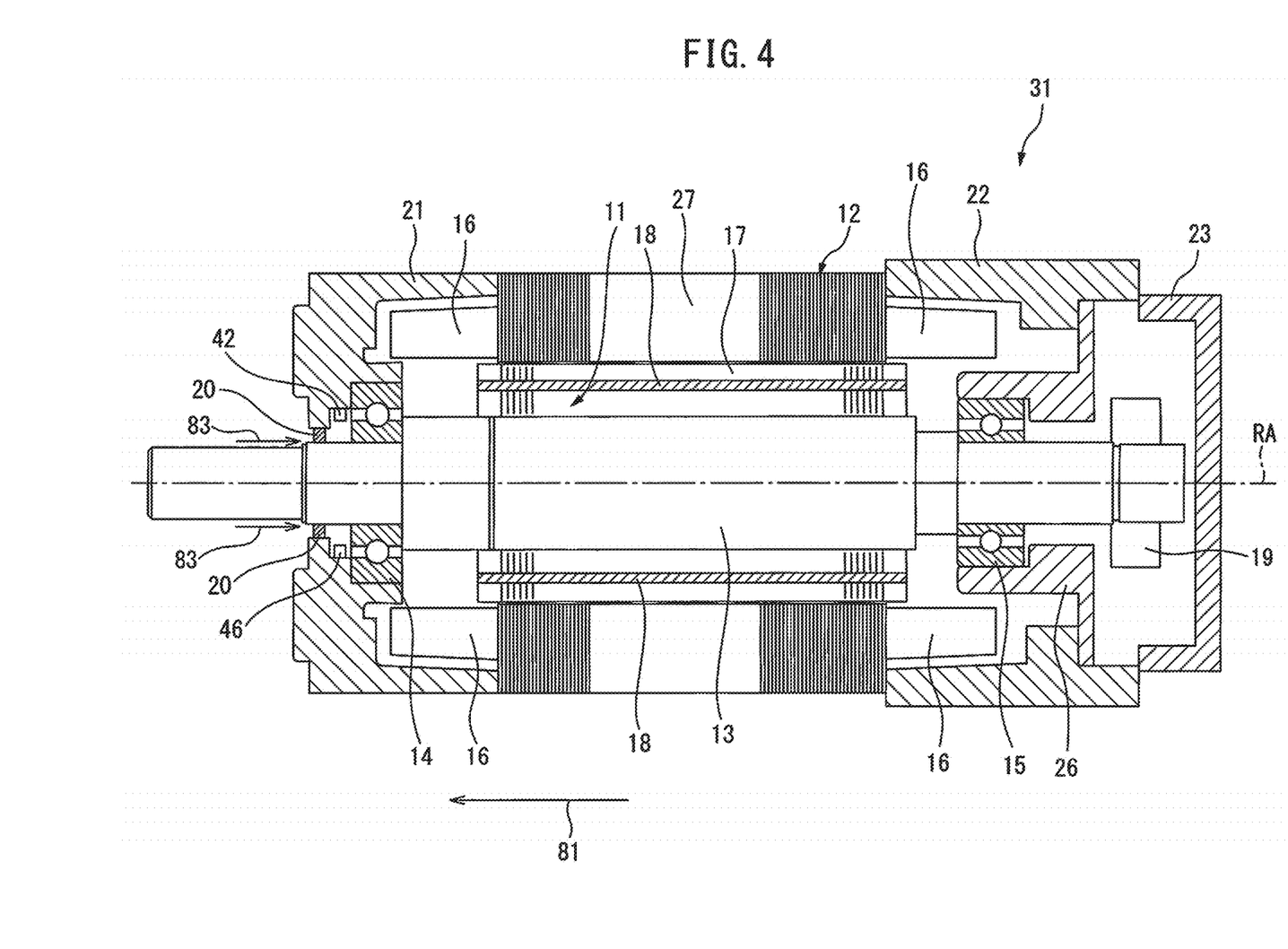
FIG. 4 is a schematic cross-sectional view of a feed axis motor in which a sensor of the second foreign matter detection device according to the embodiment is arranged.

Next, an example in which foreign matter other than cutting liquid penetrates into the interior of the feed axis motor will be described. FIG. 3 is a block diagram of another machine tool according to the present embodiment. FIG. 4 is a schematic cross-sectional view of the feed axis motor of the other machine tool according to the present embodiment. The machine tool 1 shown in FIG. 3 includes a second foreign matter detection device 52.

Referring to FIG. 3 and FIG. 4, the second foreign matter detection device 52 detects the penetration of swarf or lubricant as the foreign matter into the feed axis motor 31. First, judgment of the penetration of swarf will be described. The machine tool 1 may machine a workpiece which has magnetic property in some cases. For example, a workpiece made of iron may be machined in some cases. The foreign matter detection device 52 includes a proximity sensor 46 as the sensor for detecting the physical property of the foreign matter. The proximity sensor 46 detects the distance from the proximity sensor 46 to an object. Alternatively, the proximity sensor 46 detects the approach of an object to a predetermined distance. The proximity sensor 46 according to the present embodiment detects an object which has magnetic property. In other words, the proximity sensor 46 detects the object which has magnetic property without detecting an object which does not have magnetic property. The swarf which has magnetic property is generated when the workpiece is machined by the machine tool 1.

An operator determines a distance judgment range related to the swarf in advance as the information on the physical property of the foreign matter, and inputs the judgment range to the storage unit 3. The judgment unit 10 acquires the distance judgment range related to the swarf from the storage unit 3. Furthermore, the judgment unit 10 acquires the output of the proximity sensor 46. The judgment unit 10 judges whether an object has approached to within the distance judgment range based on the output of the proximity sensor 46. When the object has approached to within the distance judgment range, the judgment unit 10 judges that the swarf has penetrated into the interior of the feed axis motor 31. In other words, when the approach of the object is detected by the proximity sensor 36, the judgment unit 10 judges that the swarf has penetrated into the interior of the feed axis motor 31.

When swarf has penetrated into the interior of the feed axis motor 31, there is a risk of winding insulation failure or insulation failure in the connectors arranged in the interior of the feed axis motor 31. Furthermore, when swarf penetrates into the component such as the bearing 14, 15, there is a risk of the occurrence of abnormal noise, vibration, or damage. When the judgment unit 10 judges that swarf has penetrated, the display unit 9 displays that swarf has penetrated. Furthermore, the display unit 9 can display that there is a risk of the occurrence of component insulation failure, component damage, noise, and vibration in the interior of the feed axis motor 31.

Referring to FIG. 4, since the swarf has a certain size, the possibility of the penetration thereof from the portions at which the housings 21, 22 and the stator 12 contact is low. Conversely, there is a risk that swarf penetrates from the portion at which the oil seal 20 and the shaft 13 contact, as indicated by arrow 83. Thus, the proximity sensor 46 can be arranged in the vicinity of the portion at which the oil seal 20 and the shaft 13 contact. The proximity sensors 46 can be arranged in the vicinities of the portions at which a plurality of components which isolate the exterior and the interior of the electric motor contact each other. For example, a proximity sensor 46 can be arranged in the gap between the oil seal 20 and the bearing 14. According to this configuration, the penetration of swarf can be more accurately judged.

Next, the judgment of the penetration of lubricant will be described. A reduction gear may be connected to the shaft 13 of the feed axis motor 31 in some cases. Lubricant for lubricating gears is applied to the interior of the reduction gear. Thus, the lubricant may penetrate into the interior of the feed axis motor 31 in some cases.

The foreign matter detection device 52 includes an ion sensor 42 and a pH sensor 43 as sensors for detecting the physical properties of the foreign matter. The ion sensor 42 detects an ion corresponding to a substance contained in the lubricant. An extreme pressure additive may be added to the lubricant as an additive in some cases. A sulfur compound or a chlorine compound may be contained in the extreme pressure additive of the lubricant in some cases. Thus, for example, a sensor which detects a sulfide ion or a sensor which detects a chloride ion can be used as the ion sensor 42 for detecting the lubricant.

The operator determines an ion concentration judgment range related to the lubricant in advance as the information on the physical property of the foreign matter, and inputs the judgment range to the storage unit 3. The judgment unit 10 judges whether the ion concentration is within the judgment range related to the lubricant based on the output of the ion sensor 42. When the ion concentration is within the judgment range related to the lubricant, the judgment unit 10 judges that the lubricant has penetrated into the interior of the feed axis motor 31.

Additionally, the operator determines a pH value judgment range related to the lubricant in advance as the information on the physical property of the foreign matter, and inputs the judgment range to the storage unit 3. The pH value of the lubricant changes depending on the additives. The judgment unit 10 judges whether the pH value is within the judgment range related to the lubricant based on the output of the pH sensor 43. When the pH value is within the judgment range related to the lubricant, the judgment unit 10 judges that the lubricant has penetrated into the interior of the feed axis motor 31.

When the lubricant comes into contact with the component in the interior of the feed axis motor 31, there is a risk that insulation failure may occur in some cases. When it is judged that the lubricant has penetrated into the interior of the feed axis motor 31, the display unit 9 can display that there is a risk of the occurrence of insulation failure of the component arranged in the interior of the feed axis motor 31. For example, the display unit 9 displays that there is a risk of occurrence of insulation failure in the coil or the connector. Alternatively, an electromagnetic brake may be arranged between the oil seal 20 and the bearing 14. Due to lubricant penetrating into the electromagnetic brake, the clutch may slip and the electromagnetic brake may not operate sufficiently. For this reason, the display part 9 can display that there is a risk that the electromagnetic brake may not operate sufficiently.

Referring to FIG. 4, the lubricant is considered to flow from the reduction gear connected to the shaft 13. The lubricant penetrates from the portion at which the oil seal 20 and the shaft 13 contact, as indicated by arrow 83. Thus, an ion sensor 42 for detecting the penetration of the lubricant can be arranged in the vicinity of the portion at which the oil seal 20 and the shaft 13 contact. The ion sensor 42 can be arranged in the vicinity of the portion at which the plurality of components which isolate the exterior and the interior of the electric motor contact each other in this manner. For example, an ion sensor 42 can be arranged in the gap between the oil seal 20 and the bearing 14. Furthermore, the pH sensor 43 can be arranged in position identical to the ion sensor 42. Due to this configuration, the penetration of lubricant can be more accurately detected.

The judgment range of the pH value related to the cutting liquid based on the output of the pH sensor 43 and the judgment range of the pH value related to the lubricant based on the output of the pH sensor 43 may be different from each other in some cases. In particular, the judgment range related to the cutting liquid may not overlap the judgment range related to the lubricant in some cases. In this case, the judgment unit 10 can judge the penetration of cutting liquid and the penetration of lubricant based on the output of a shared pH sensor 43.

The pH value judgment range related to the cutting liquid and the pH value judgment range related to the lubricant can be used as the information on the physical property of the foreign matter in this case. The judgment unit 10 judges whether the pH value is within the judgment range related to the cutting liquid based on the output of the pH sensor 43. Furthermore, the judgment unit 10 judges whether the pH value is within the judgment range related to the lubricant based on the output of the pH sensor 43. Further, when the pH value is within the judgment range related to the cutting liquid, the judgment unit 10 judges that the cutting liquid has penetrated into the interior of the feed axis motor 31. Alternatively, when the pH value is within the judgment range related to the lubricant, the judgment unit 10 judges that the lubricant has penetrated into the interior of the feed axis motor 31.

When the judgment ranges for the output of one type of sensor are different from each other for a plurality of types of foreign matters in this manner, a plurality of types of foreign matters can be judged by a shared sensor. Though the penetration of cutting liquid or the penetration of lubricant is judged based on the output of the pH sensor in the embodiment described above, the embodiment is not limited to this. For example, when the judgment range of the ion related to the cutting liquid for the output of the ion sensor and the judgment range of the ion of the lubricant for the output of the ion sensor do not overlap, the penetration of cutting liquid or the penetration of lubricant can be judged based on the output of a shared ion sensor.

The foreign matter detection devices 51, 53 according to the present embodiment use the sensor for detecting the physical property of the foreign matter to judge the penetration of foreign matter and the type of the foreign matter. Thus, the penetration of foreign matter can be more accurately judged. For example, consider the arrangement of a sensor which detects temperature in the interior of an electric motor to detect the penetration of foreign matter. In this case, influence such as the temperature around the motor or the heat generated by the motor is exerted, whereby accurate judgment cannot be performed in comes cases. However, since the foreign matter detection device according to the present embodiment performs judgment related to the physical property of the foreign matter, the penetration of foreign matter can be more accurately judged.

Though the foreign matter detection devices 51, 52 according to the embodiments described above are provided with the humidity sensor 41, the ion sensor 42, the pH sensor 43, the gas sensor 44, the odor sensor 45, and the proximity sensor 46, the embodiment is not limited to this. Any sensor for detecting the physical property of the foreign matter can be provided as the sensor arranged in the interior of the electric motor.

Though the controller according to the present embodiment is arranged in a position distant from the motor and is connected to the motor via communication lines, the embodiment is not limited to this. A part or the entirety of the controller may be affixed to the motor.

Though a feed axis motor has been described as an example of the electric motor of the machine tool in the present embodiment, the embodiment is not limited to this. The foreign matter detection device according to the present embodiment can be applied to other electric motors arranged in a machine tool. In particular, since the cutting liquid and the swarf are scattered in the interior of the machining chamber of the machine tool, the foreign matter can easily penetrate into the interior of the electric motor. Thus, it is preferable that the foreign matter detection device according to the present embodiment be applied to the electric motor, such as the spindle motor, arranged in the interior of the machining chamber.

According to the foreign matter detection device according to an aspect of the present disclosure, the penetration of foreign matter into the interior of an electric motor arranged in the machine tool can be more accurately detected.

The above embodiments can be appropriately combined. In the drawings described above, identical or equivalent portions have been assigned the same reference signs. It should be noted that the embodiments described above are merely exemplary and do not limit the invention. Furthermore, the embodiments include the modifications of the embodiments indicated in the claims.

The invention claimed is:

1. A foreign matter detection device configured to detect penetration of a foreign matter into an interior of an electric motor in a machine tool, the device comprising:
   a sensor in the interior of the electric motor;
   a controller configured to judge whether the foreign matter penetrates into the interior of the electric motor based on an output of the sensor, wherein
   the sensor is configured to detect a physical property of the foreign matter, and the controller is configured to:
      store information on the physical property of the foreign matter in a storage medium in the device, and
      judge the penetration of the foreign matter and a type of the foreign matter by comparing the output of the sensor with the information on the physical property of the foreign matter, wherein
   the machine tool machines a workpiece having magnetic property,
   the sensor is a proximity sensor configured to detect an object having magnetic property approaching the sensor,
   the information on the physical property of the foreign matter is a judgment range of distance between the object and the proximity sensor, and
   the controller is further configured to judge whether the object approaches to within the judgment range of distance based on an output of the proximity sensor, and judge that swarf generated during machining of the workpiece has penetrated into the interior of the electric motor in response to the object approaching to be within the judgment range of distance.

2. The foreign matter detection device according to claim 1, wherein
   the sensor is an ion sensor configured to detect an ion corresponding to a substance contained in a cutting liquid, the judgment range related to the physical property of the foreign matter is an ion concentration judgment range related to the cutting liquid, and the controller is further configured to judge whether the ion concentration is within the judgment range related to the cutting liquid based on an output of the ion sensor, and judge that the cutting liquid has penetrated into the interior of the electric motor in response to the ion concentration being within the judgment range related to the cutting liquid.

3. The foreign matter detection device according to claim 1, wherein the sensor is a pH sensor detecting a pH value, the judgment range related to the physical property of the foreign matter is a pH value judgment range related to a cutting liquid, and the controller is further configured to judge whether the pH value is within the judgment range related to the cutting liquid based on an output of the pH sensor, and judge that the cutting liquid has penetrated into the interior of the electric motor in response to the pH value being within the judgment range related to the cutting liquid.

4. The foreign matter detection device according to claim 1, wherein the sensor is a gas sensor or odor sensor detecting a gas corresponding to a substance contained in a cutting liquid, the judgment range related to the physical property of the foreign matter is a gas concentration judgment range related to the cutting liquid, and the controller is further configured to judge whether the gas concentration is within the judgment range related to the cutting liquid based on an output of the gas sensor or the odor sensor, and judge that the cutting liquid has penetrated into the interior of the electric motor in response to the gas concentration being within the judgment range related to the cutting liquid.

5. The foreign matter detection device according to claim 1, wherein the machine tool is configured so as to inject a water-soluble cutting liquid toward a workpiece, the sensor is a humidity sensor, the judgment range related to the physical property of the foreign matter is a humidity judgment range related to the water-soluble cutting liquid, and the controller is further configured to judge whether a humidity of the interior of the electric motor is within the judgment range related to the water-soluble cutting liquid based on an output of the humidity sensor, and judge that the water-soluble cutting liquid has penetrated into the interior of the electric motor in response to the humidity being within the judgment range related to the water-soluble cutting liquid.

6. The foreign matter detection device according to claim 1, wherein the sensor is an ion sensor detecting an ion corresponding to a substance contained in a lubricant, the judgment range related to the physical property of the foreign matter is an ion concentration judgment range related to the lubricant, and the controller is further configured to judge whether the ion concentration is within the judgment range related to the lubricant based on an output of the ion sensor, and judge that the lubricant has penetrated into the interior of the electric motor in response to the ion concentration being within the judgment range related to the lubricant.

7. The foreign matter detection device according to claim 1, wherein the sensor is a pH sensor detecting a pH value, the judgment range related to the physical property of the foreign matter is a pH value judgment range related to a lubricant, and the controller is further configured to judge whether the pH value is within the judgment range related to the lubricant based on an output of the pH sensor, and judge that the lubricant has penetrated into the interior of the electric motor in response to the pH value being within the judgment range related to the lubricant.

8. The foreign matter detection device according to claim 1, wherein the electric motor includes a plurality of components isolating an exterior and the interior of the electric motor, and the sensor is in a vicinity of a portion in which the plurality of components are in contact.

9. The foreign matter detection device according to claim 1, comprising a plurality of sensors judging the penetration of a specific predetermined foreign matter, wherein the plurality of sensors include sensors of types that are different from each other, and the controller is further configured to judge the penetration of the foreign matter and the type of the foreign matter for each of the outputs of the sensors, and judge that the foreign matter has penetrated into the interior of the electric motor in response to the penetration of the foreign matter being judged for the output of at least one of the plurality of sensors.

10. The foreign matter detection device according to claim 1, comprising a plurality of sensors judging the penetration of a specific predetermined foreign matter, wherein the plurality of sensors include sensors of types that are different from each other, and the controller is further configured to judge the penetration of the foreign matter and the type of the foreign matter for each output of the plurality of sensors, and judge that the foreign matter has penetrated into the interior of the electric motor in response to the penetration of foreign matter being judged for the outputs of all of the sensors, and judge that the foreign matter has not penetrated into the interior of the electric motor in response to the penetration of foreign matter not being judged for the output of at least one of the plurality of sensors.

11. A foreign matter detection device configured to detect penetration of a foreign matter into an interior of an electric motor in a machine tool, the device comprising:

a sensor in the interior of the electric motor;

a controller configured to judge whether the foreign matter penetrates into the interior of the electric motor based on an output of the sensor, wherein the sensor is configured to detect a physical property of the foreign matter, and the controller is configured to:

store information on the physical property of the foreign matter in a storage medium in the device, and judge the penetration of the foreign matter and a type of the foreign matter by comparing the output of the sensor with the information on the physical property of the foreign matter, wherein the sensor is a pH sensor detecting a pH value, the information on the physical property of the foreign matter is a pH value judgment range related to a cutting liquid and a pH value judgment range related to a lubricant, the judgment range related to the cutting liquid is a range that does not overlap with the judgment range related to the lubricant, and the controller is further configured to judge whether the pH value is within the judgment range related to the cutting liquid or is within the judgment range related to the lubricant based on an output of the pH sensor, and judge that the cutting liquid has penetrated into the interior of the electric motor in response to the pH value being within the judgment range related to the cutting liquid, and judge that the lubricant has penetrated into the interior of the electric motor in response to the pH value being within the judgment range related to the lubricant.

* * * * *